US008902701B2

(12) United States Patent  
Kinoshita et al.

(10) Patent No.: US 8,902,701 B2  
(45) Date of Patent: Dec. 2, 2014

(54) METHODS, APPARATUS AND ARTICLES OF MANUFACTURE TO DETERMINE ANISOTROPY INDICATORS FOR SUBTERRANEAN FORMATIONS

(75) Inventors: Toshihiro Kinoshita, Sagamihara (JP); Alain Dumont, Kawasaki (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 1080 days.

(21) Appl. No.: 12/634,623

(22) Filed: Dec. 9, 2009

(65) Prior Publication Data

US 2011/0134719 A1    Jun. 9, 2011

(51) Int. Cl.
*G01V 1/28*    (2006.01)
*G01V 1/48*    (2006.01)

(52) U.S. Cl.
CPC ............ *G01V 1/48* (2013.01); *G01V 2210/626* (2013.01)
USPC .......................................................... 367/31

(58) Field of Classification Search
CPC ........................... G01V 1/48; G01V 2210/626
USPC ........ 367/31, 32; 702/6; 166/250.01; 175/40, 175/50
See application file for complete search history.

(56) References Cited

U.S. PATENT DOCUMENTS

| | | | |
|---|---|---|---|
| 5,278,805 A | 1/1994 | Kimball | |
| 6,308,137 B1 | 10/2001 | Underhill et al. | |
| 6,614,716 B2 * | 9/2003 | Plona et al. | .............. 367/31 |
| 6,850,168 B2 | 2/2005 | Tang et al. | |
| 6,920,082 B2 | 7/2005 | Tang | |
| 6,930,616 B2 | 8/2005 | Tang et al. | |
| 6,985,086 B2 | 1/2006 | Tang et al. | |
| 7,257,489 B2 | 8/2007 | Hsu et al. | |
| 7,463,550 B2 | 12/2008 | Sinha et al. | |
| 7,529,152 B2 | 5/2009 | Sinha et al. | |
| 2006/0120217 A1 | 6/2006 | Wu et al. | |
| 2007/0030761 A1 | 2/2007 | Donald et al. | |
| 2007/0268782 A1 | 11/2007 | Pabon et al. | |

OTHER PUBLICATIONS

Liu, "Stoneley Wave-Derived (Delta-t) Shear Log," SPWLA Twenty-Fifth Annual Logging Symposium, Jun. 10-13, 1984 (14 pages).
Kinoshita et al., "Next Generation LWD Sonic Tool," the 14th Formation Evaluation Symposium of Japan, Sep. 29-30, 2008 (7 pages).

* cited by examiner

*Primary Examiner* — Daniel L Murphy
(74) *Attorney, Agent, or Firm* — Daryl R. Wright; Brigette Echols

(57) ABSTRACT

Example methods, apparatus and articles of manufacture to determine anisotropy indicators for subterranean formations are disclosed. A disclosed example method includes computing a first shear slowness value from measured quadrupole waves, computing a second shear slowness value from measured Stoneley waves, and comparing the first and second shear slowness values to determine an anisotropy indicator representative of anisotropy of a subterranean formation.

21 Claims, 14 Drawing Sheets

METHODS, APPARATUS AND ARTICLES OF MANUFACTURE TO DETERMINE ANISOTROPY INDICATORS FOR SUBTERRANEAN FORMATIONS

FIELD OF THE DISCLOSURE

This patent relates generally to subterranean formations and, more particularly, to methods, apparatus and articles of manufacture to determine anisotropy indicators for subterranean formations.

BACKGROUND

Wellbores may be drilled into the ground or ocean bed to recover natural deposits of oil and/or gas, as well as other desirable materials that are trapped in subterranean, underground and/or geological formations in the Earth's crust. A wellbore may be drilled using a drill bit attached to the lower end of a drillstring. Once a formation of interest is reached, the formation and/or its contents may be investigated and/or evaluated using one or more downhole formation evaluation tools. Some example formation evaluation tools are part of the drillstring used to form the wellbore and may be used to evaluate formations during the drilling process. However, such evaluations need not be performed while the drill bit is actually cutting through the formation. For example, measurements may occur during interruptions in the drilling process, such as when the drill bit is briefly stopped to take measurements, after which drilling resumes. Measurements taken during such intermittent breaks in drilling are still considered to be made while drilling because they do not require the drillstring to be tripped, that is, removed from the wellbore. Other example formation evaluation tools may be used after the wellbore has been drilled or formed and the drillstring removed from the wellbore. These tools may be lowered into a wellbore using a wireline for electronic communication and/or power transmission, and therefore are commonly referred to as wireline tools. In general, a wireline tool may be lowered into a wellbore to measure any number and/or type(s) of formation properties at any desired depth(s). Additionally or alternatively, a formation evaluation tool may be lowered into a wellbore via coiled tubing or pipe.

SUMMARY

Example methods, apparatus and articles of manufacture to determine anisotropy indicators for subterranean formations are disclosed. A disclosed example method includes computing a first shear slowness value from measured quadrupole waves, computing a second shear slowness value from measured Stoneley waves, and comparing the first and second shear slowness values to determine an anisotropy indicator representative of anisotropy of a subterranean formation.

A disclosed example downhole tool apparatus includes a first receiver to measure quadrupole waves, a second receiver to measure Stoneley waves, a quadrupole module to compute a first shear slowness value from the measured quadrupole waves, a Stoneley module to compute a second shear slowness value from the measured Stoneley waves, and an anisotropy determiner to compare the first and second shear slowness values to determine an anisotropy indicator representative of anisotropy of a subterranean formation.

Another disclosed example method includes computing a first plurality of slowness values for respective ones of a plurality of frequencies from measured quadrupole waves, modeling the formation as a homogeneous isotropic formation to compute a second plurality of slowness value for respective ones of a plurality of frequencies, determining an anisotropy indicator representative of anisotropy of the formation based on the first and second pluralities of slowness values.

DETAILED DESCRIPTION

Figure 1:
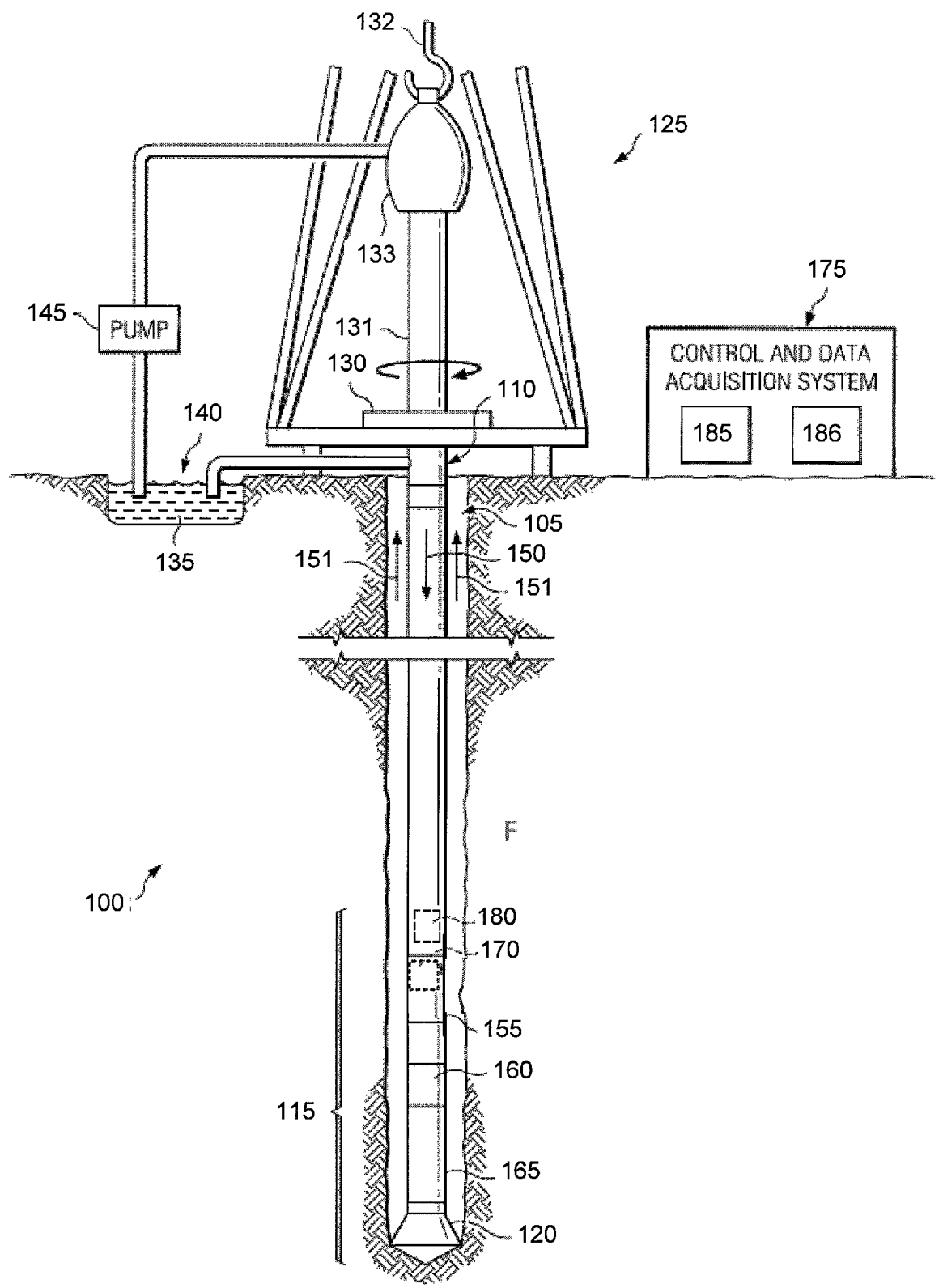
FIG. 1 illustrates an example wellsite drilling system having a downhole anisotropy module.

Certain examples are shown in the above-identified figures and described in detail below. The figures are not necessarily to scale and certain features and certain views of the figures may be shown exaggerated in scale or in schematic for clarity and/or conciseness. It is to be understood that while the following disclosure provides many different embodiments or examples for implementing different features of various embodiments, other embodiments may be implemented and/or structural changes may be made without departing from the scope of this disclosure. Further, while specific examples of components and arrangements are described below these are, of course, merely examples and are not intended to be limiting. In addition, the present disclosure may repeat reference numerals and/or letters in the various examples. This repetition is for the purpose of clarity and does not in itself dictate a relationship between the various embodiments and/or example configurations discussed. Moreover, the depiction or description of a first feature over or on a second feature may include embodiments in which the first and second elements are implemented in direct contact, and may also include embodiments in which other elements may be interposed between the first and second elements, such that the first and second elements need not be in direct contact.

Although the following discloses examples including, among other components, software and/or firmware executed on hardware, it should be noted that such systems are merely illustrative and should not be considered as limiting. For example, it is contemplated that any form of logic may be used to implement the systems or subsystems disclosed herein. Logic may include, for example, implementations that are made exclusively in dedicated hardware (e.g., circuits, transistors, logic gates, hard-coded processors, programmable processor(s), application specific integrated circuit(s) (ASIC(s)), programmable logic device(s) (PLD(s)), field-programmable logic device(s) (FPLD(s)), field-programmable gate array(s) (FPGA(s)), etc.), exclusively in software, exclusively in firmware, and/or any combination of hardware, firmware, and/or software. Accordingly, while the following describes certain examples, persons of ordinary skill in the art will readily appreciate that the examples are not the only way to implement such systems.

While the example apparatus, methods and articles of manufacture disclosed herein are described in the context of downhole wireline and drillstring tools, they are also applicable to any number and/or type(s) of additional and/or alternative downhole tools such as coiled tubing or pipe deployed tools.

FIG. 1 depicts an example wellsite drilling system 100 according to one or more aspects of the present disclosure, which may be employed onshore (as shown) and/or offshore. In the example wellsite drilling system 100 of FIG. 1, a borehole 105 is formed in a subsurface, subterranean, underground and/or geological formation F by rotary and/or directional drilling. In the illustrated example of FIG. 1, a drillstring 110 is suspended within the example wellbore 105 and has a bottom hole assembly (BHA) 115 having a drill bit 120 at its lower end. A surface system includes a platform and derrick assembly 125 positioned over the wellbore 105. The assembly 125 may include a rotary table 130, a kelly 131, a hook 132 and/or a rotary swivel 133. The drillstring 110 may be rotated by the rotary table 130, energized by means not shown, which engages the kelly 131 at the upper end of the drillstring 110. The example drillstring 110 may be suspended from the hook 132, which may be attached to a traveling block (not shown) and through the kelly 131 and the rotary swivel 133, which permits rotation of the drillstring 110 relative to the hook 132. Additionally or alternatively, a top drive system may be used.

In the example of FIG. 1, the surface system may also include drilling fluid 135, which is commonly referred to in the industry as mud, stored in a pit 140 formed at the wellsite. A pump 145 may deliver the drilling fluid 135 to the interior of the drillstring 110 via a port (not shown) in the swivel 133, causing the drilling fluid 135 to flow downwardly through the drillstring 110 as indicated by the directional arrow 150. The drilling fluid 135 may exit the drillstring 110 via water courses, nozzles, jets and/or ports in the drill bit 120, and then circulate upwardly through the annulus region between the outside of the drillstring 110 and the wall of the wellbore 105, as indicated by the directional arrows 151. The drilling fluid 135 may be used to lubricate the drill bit 120 and/or carry formation cuttings up to the surface, where the drilling fluid 135 may be cleaned and returned to the pit 140 for recirculation. The drilling fluid 135 may also be used to create a mudcake layer (not shown) on the walls of the wellbore 105. It should be noted that in some implementations, the drill bit 120 may be omitted and the BHA 115 may be conveyed via tubing and/or pipe.

The example BHA 115 of FIG. 1 may include, among other things, any number and/or type(s) of downhole tools, such as any number and/or type(s) of logging-while-drilling (LWD) modules (one of which is designated at reference numeral 155), and/or any number and/or type(s) of measuring-while-drilling (MWD) modules (one of which is designated at reference numeral 160), a rotary-steerable system or mud motor 165, and/or the example drill bit 120. MWD typically refers to measuring the drill bit trajectory as well as wellbore temperature and pressure, while LWD refers to measuring formation and/or formation fluid parameters or properties, such as an anisotropy, a resistivity, a porosity, a permeability, a viscosity, a density, a phase-change pressure, and a sonic velocity, among others. Real-time data, such as the formation pressure, enables decisions about drilling mud weight and composition, as well as decisions about drilling rate and/or weight-on-bit during the drilling process. While LWD and MWD may have different meanings to those of ordinary skill in the art, such distinctions are not germane to this disclosure, and therefore this disclosure should not be read as distinguishing between these two terms.

The example LWD module 155 of FIG. 1 is housed in a special type of drill collar, as it is known in the art, and may contain any number and/or type(s) of logging tool(s), measurement tool(s), sensor(s), device(s), formation evaluation tool(s), fluid analysis tool(s), and/or fluid sampling device(s). For example, the LWD module 155 may implement an anisotropy module 170 to measure, compute, detect, characterize, identify and/or otherwise determine anisotropies of the formation F. Example manners of implementing the example anisotropy module 170 are described below in connection with FIGS. 5-9. The LWD module 155 may also include capabilities for measuring, processing, and/or storing information, as well as for communicating with the MWD module 160 and/or with surface equipment, such as a control and data acquisition system 175. The example LWD module 155 and/or, more specifically, the example anisotropy module 170 of FIG. 1 may include a processor (e.g., the example processor P105 of FIG. 15) to implement one or more aspects of the present disclosure.

The example MWD module 160 of FIG. 1 is also housed in a special type of drill collar and contains one or more devices for measuring characteristics of the drillstring 110 and/or the drill bit 120. The example MWD tool 160 may also include an apparatus (not shown) for generating electrical power for use by the BHA 115. Example devices to generate electrical power include, but are not limited to, a mud turbine generator powered by the flow of the drilling fluid, and a battery system. Example measuring devices include, but are not limited to, a weight-on-bit measuring device, a torque measuring device, a vibration measuring device, a shock measuring device, a stick/slip measuring device, a direction measuring device, and an inclination measuring device. Additionally or alternatively, the MWD module 160 may include an annular pressure sensor, and/or a natural gamma ray sensor.

The example MWD module 160 of FIG. 1 may also include capabilities for measuring, processing, and storing information, as well as for communicating with the example control and data acquisition system 175. For example, the example MWD module 160 and the example control and data acquisition system 175 may communicate information either way (i.e., uplink and downlink) via an example two-way telemetry module 180. Example telemetry modules 180 include, but are not limited to, a mud-pulse telemetry module, a wired drillpipe telemetry module, an electromagnetic telemetry module and/or an acoustic telemetry module. The example telemetry module 180 of FIG. 1 may be implemented by the example MWD module 160 and/or elsewhere within the example BHA 115. Further, while the example telemetry module 180 of FIG. 1 is shown as being implemented separate from the example anisotropy module 170, the telemetry module 180 may alternatively be implemented by the anisotropy module 170.

The example telemetry module 180 of FIG. 1 may include a downhole control system (not shown) communicatively coupled to the example control and data acquisition system 175. In the illustrated example of FIG. 1, the control and data acquisition system 175 and/or the downhole control system may be configured to control the example anisotropy module 170.

The example control and data acquisition system 175 of FIG. 1 may include a controller 185 having an interface configured to receive commands from a surface operator and/or may include a processor 186 configured to detect formation anisotropy based on measurements taken or collected by the example anisotropy module 170.

Figure 2:
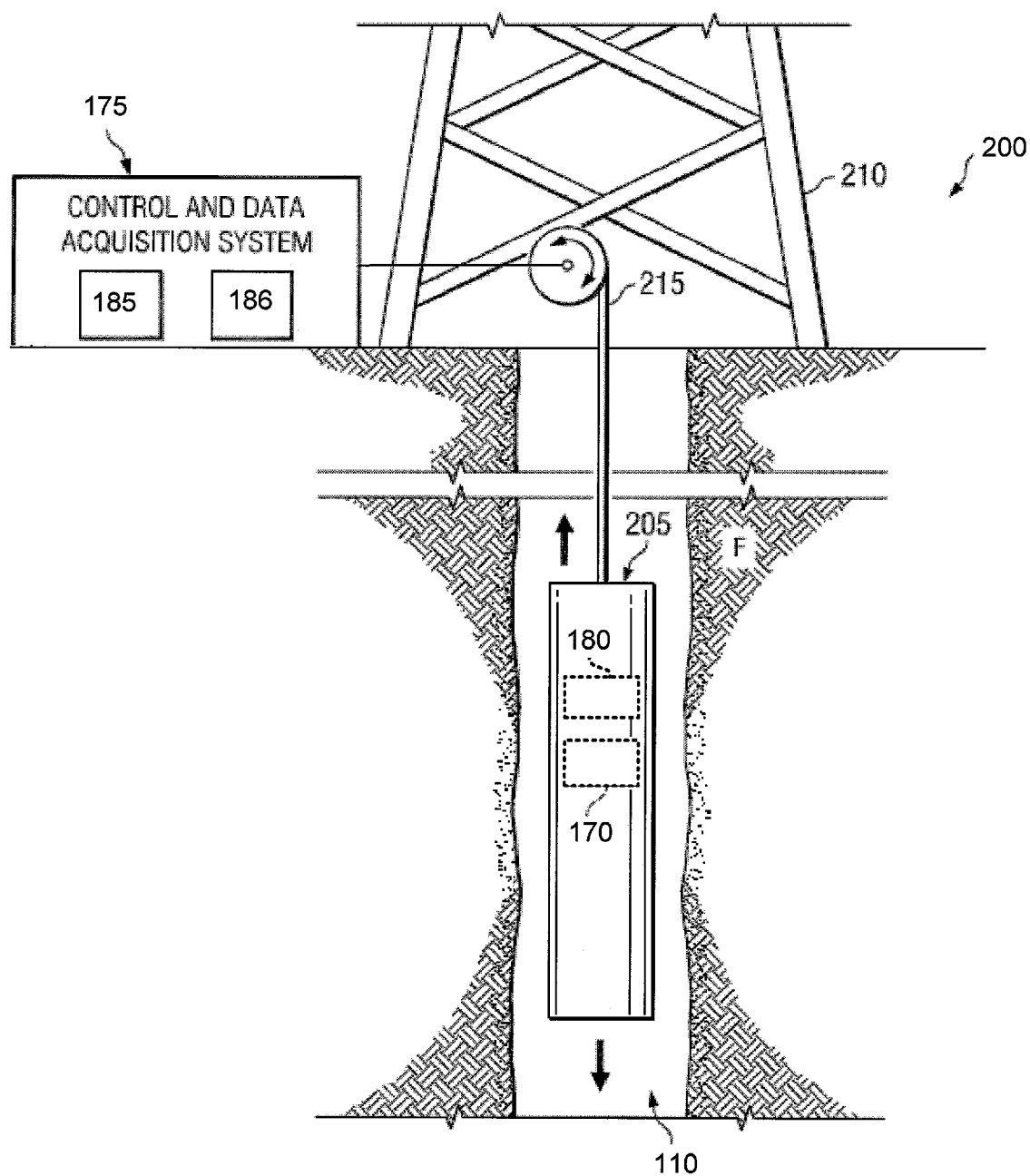
FIG. 2 illustrates an example wellsite wireline system having a downhole anisotropy module.

FIG. 2 depicts an example wireline wellsite system 200 according to one or more aspects of the present disclosure. The example wellsite system 200 of FIG. 2 may be situated onshore (as shown) and/or offshore. The example wellsite system 200 may include a wireline tool 205, which may be configured to, among other things, determine, detect and/or measure anisotropies of the subterranean formation F into which the wellbore 110 has been drilled.

The example wireline tool 205 of FIG. 2 is deployed or suspended from a rig 210 into the wellbore 110 from the lower end of a multi-conductor cable 215, which may be spooled on a winch (not shown) at the Earth's surface. The example cable 215 may be used to position the wireline tool 205 within and/or move the wireline tool 205 through any particular portion(s) of the geologic formation F. At the surface, the cable 215 may be communicatively and/or electrically coupled to the example control and data acquisition system 175.

The example wireline tool 205 of FIG. 2 may have an elongated body and may implement any number and/or type(s) of tool(s) and/or module(s) such as the example telemetry module 180 and the example anisotropy module 170. Although the example telemetry module 180 of FIG. 2 is shown as being implemented separate from the example anisotropy module 170, the telemetry module 180 may alternatively be implemented by the anisotropy module 170. Outputs of the example anisotropy module 170 and/or other modules of the wireline tool 205 may be sent via, for example, the example telemetry module 180 to the example control and data acquisition system 175 and/or may be stored in any number and/or type(s) of memory(-ies) (not shown) for subsequent recall and/or processing.

Figure 3:
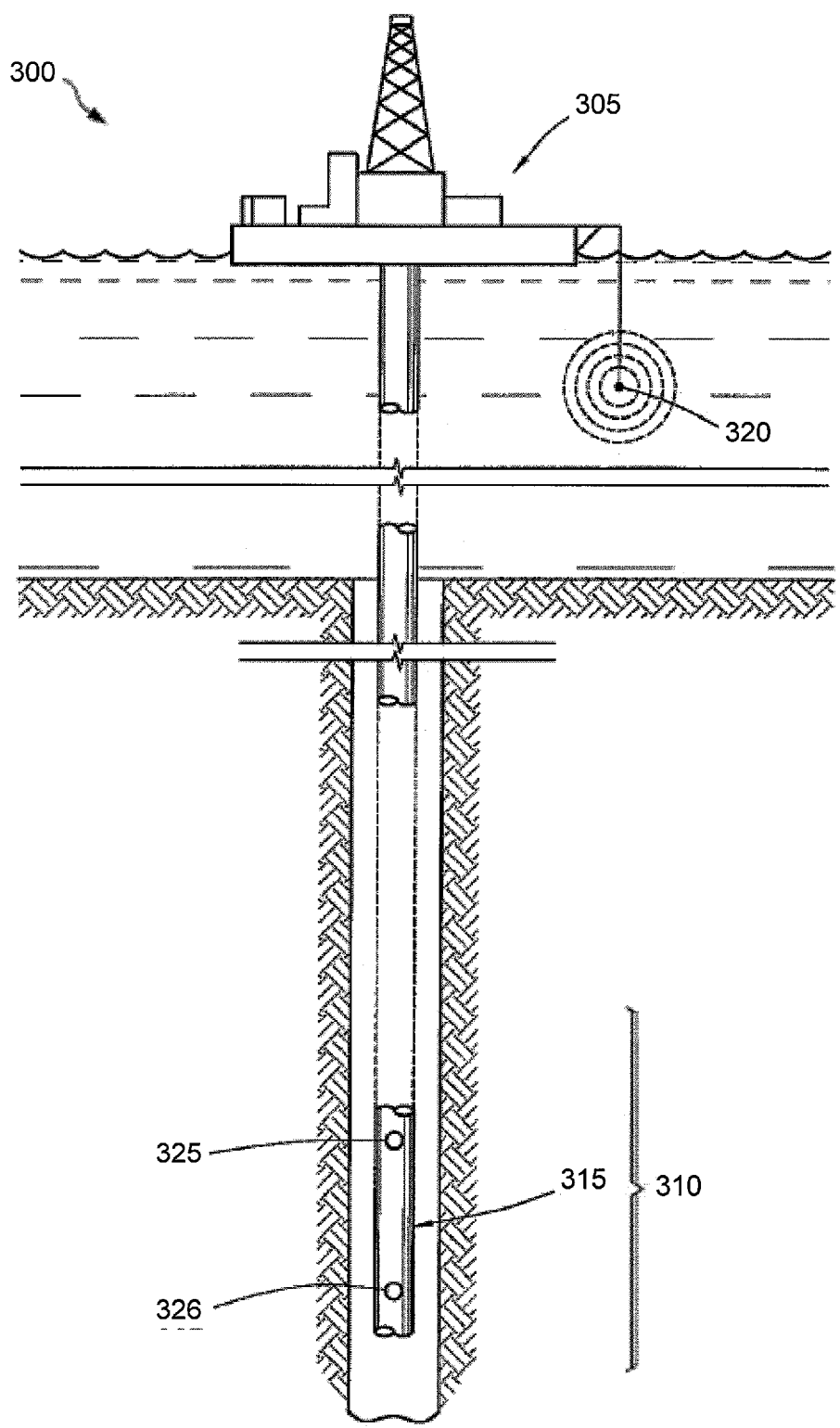
FIG. 3 illustrates an example off-shore sonic logging-while-drilling system having a downhole anisotropy module.

FIG. 3 depicts an example offshore drilling system 300 according to one or more aspects of the present disclosure. The example offshore drilling system 300 of FIG. 3 has an offshore rig 305 that includes a BHA 310 assembly having any number and/or type(s) of MWD module(s), LWD module(s), a rotary-steerable system, a mud motor, and/or a drill bit. An example LWD module is designated in FIG. 3 at reference numeral 315. Example modules that may be implemented by the example BHA 310 include, but are not limited to, the example telemetry module 180 and the example anisotropy module 170 discussed above. The example LWD tool 315 of FIG. 3 may be similar to the example LWD module 155 of FIG. 1 and may, for example, be implemented as described in U.S. Pat. No. 6,308,137, which is hereby incorporated herein by reference in its entirety.

The example offshore rig 305 of FIG. 3 may include a signal transmitter 320 deployed near the surface of the water. Alternatively, the example transmitter 320 may be implemented by the example anisotropy module 170, the example LWD module 315 and/or elsewhere within the example BHA 310. Additionally, the offshore rig 305 may include a processor (not shown) to control the transmission of signals by the transmitter 320. The processor may be implemented near the surface of the water and/or by the example BRA 310. The offshore rig 305 may also include an acoustic receiver and/or a recorder to capture reference signals near the transmitter 320. The offshore rig 305 may also include telemetry equipment (not shown) located near the surface of the water to receive signals from the transmitter 320 and/or from one or more receivers, two of which are designated at reference numerals 325 and 326, implemented by the example LWD 315 and/or elsewhere in the BHA 310. For example, telemetry equipment near the surface of the water may be communicatively coupled to the telemetry module 180 implemented by the example LWD 315 and/or elsewhere within the example BHA 310. The example telemetry module 180 may, for example, communicate outputs of the example receivers 325 and 326 to the processor near the surface of the water. Additionally or alternatively, the example anisotropy module 170 may process outputs of the receivers 325 and 326 and send anisotropy indicators to the processor via the telemetry module 180.

As described above, a downhole tool assembly may include multiple downhole modules that are operatively connected together. Downhole tools often include several modules (i.e., sections of the example BHA 115, the example wireline tool 205 and/or the example BHA 310 that perform different functions). In other words, more than one downhole tool or component may be combined on the same drillstring or wireline to accomplish multiple downhole tasks. The modules are typically connected by field joints. For example, one module of a downhole tool typically has one type of connector at one end and a second type of connector at an opposite end. The two types of connectors are made to operatively mate with each other. By using modules and/or tools with similar arrangements of connectors, all of the modules and tools may be connected end-to-end to form a downhole tool assembly. A field joint may provide an electrical connection, a hydraulic connection, and/or a flowline connection, depending on the requirements of the tools on the wireline. An electrical connection typically provides both power and communication capabilities.

Figure 4A:
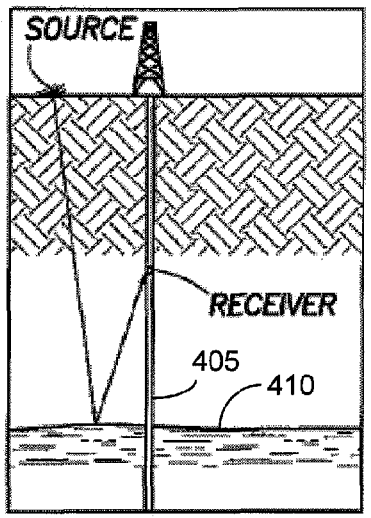
FIGS. 4A-4D illustrate example seismic-while-drilling tools having one or more transmitters located at the surface.
Figure 4B:
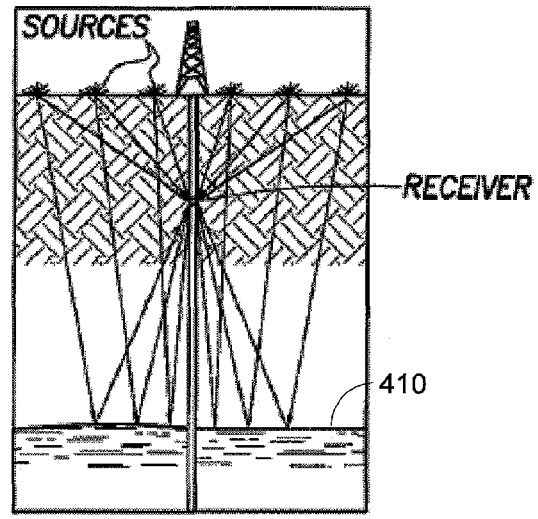
Figure 4C:
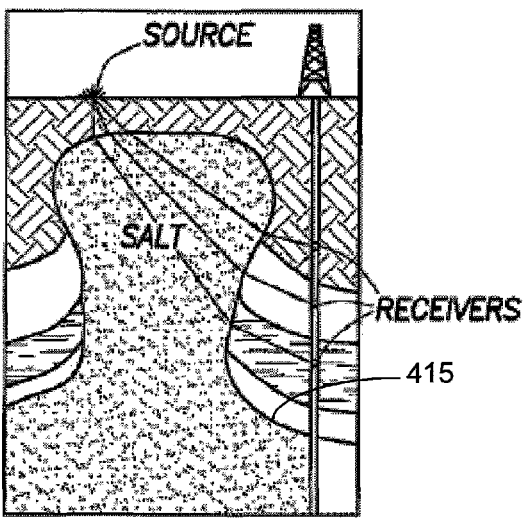
Figure 4D:
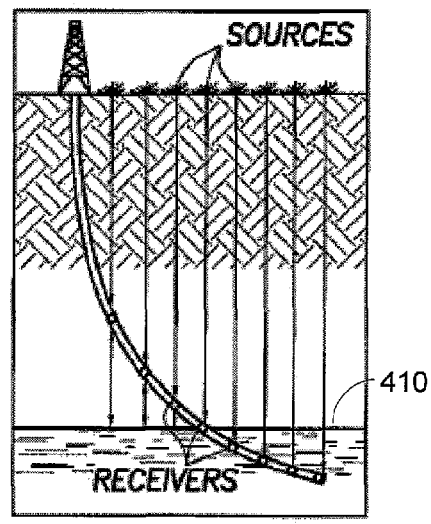

FIGS. 4A-D depict example seismic while-drilling tools that include one or more transmission sources and/or transmitters at the surface and one or more receivers in a wellbore 405. A downhole tool deployed in the wellbore 405 may implement a single receiver as shown in FIGS. 4A and 4B, or multiple receivers as shown in FIGS. 4C and 4D. FIGS. 4A and 4C show that a single transmitter may be implemented as a single seismic (e.g., signal) source. Alternatively, FIGS. 4B and 4D show a plurality of the transmitters generating respective seismic signals. FIG. 4B depicts the receiver receiving reflections and direct signals from the transmitters, while FIGS. 4C and 4D show multiple receivers receiving signals directly from the one or more transmitters. While not depicted in FIGS. 4A-D, the example receivers may include more than one sensor spaced (e.g., evenly) around the circumference of the receiver (see FIG. 6). Furthermore, the example transmitter(s) may be implemented by the BHA 310 as described in greater detail below in connection with FIGS. 5 and 6.

Seismic images may be generated from the example arrangements of the transmitter(s) and the receiver(s) of FIGS. 4A-D. FIG. 4A shows a reflection of a transmitted signal off a rock layer boundary or bed boundary 410. The example seismic imaging of the bed boundary 410 shown in FIG. 4A may be used to generate a 'zero-offset' vertical seismic profile arrangement. FIG. 4B shows a reflection of transmitted signals off the bed boundary 410. The seismic imaging example of FIG. 4B may be used to generate a 'walkway' vertical seismic profile arrangement. FIG. 4C shows a refraction through salt dome boundaries, one of which is designated at reference numeral 415. The example seismic imaging of FIG. 4C may be used to generate a 'salt proximity' vertical seismic profile. FIG. 4D includes signal reflections off the rock layer boundary 410 and/or some direct signals from the transmitters. The example seismic imaging of FIG. 4D may be used to generate a 'walk above' vertical seismic profile. The vertical profiles and/or arrangements referred to in FIGS. 4A-D are labeled vertical because the receiver(s) are oriented vertically along the axis of the wellbore 405.

Figure 5:
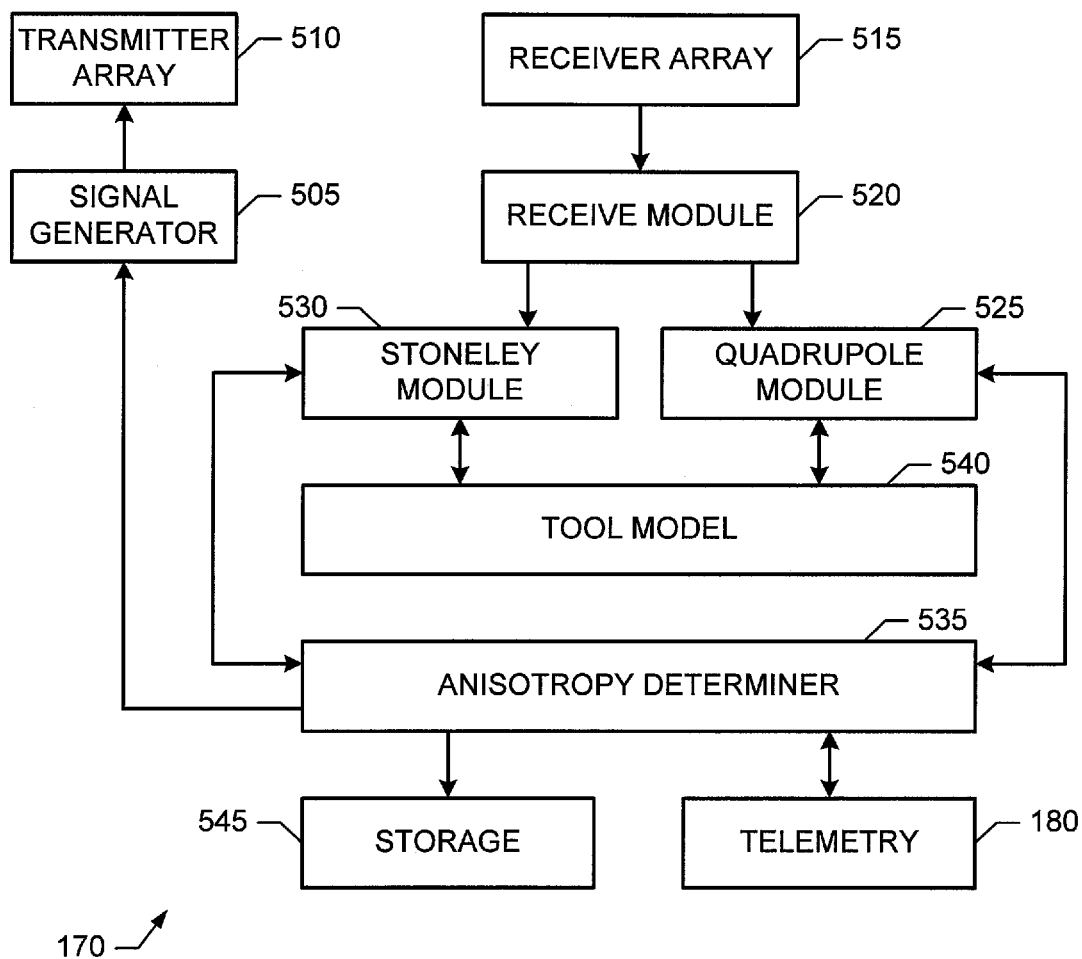
FIGS. 5 and 6 illustrate an example manner of implementing the example anisotropy modules of FIGS. 1-3 and 4A-4D.
Figures 6, 7:
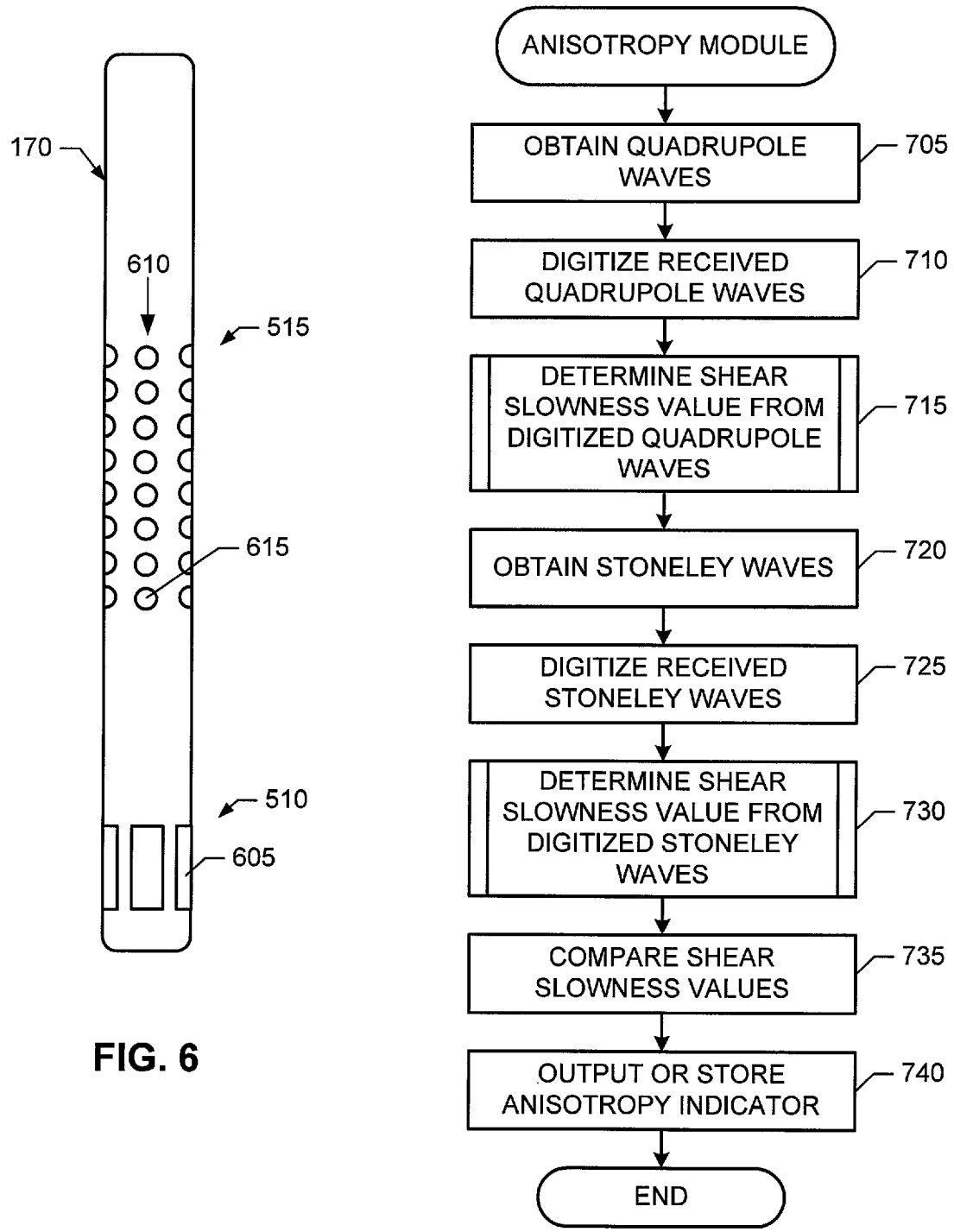
FIGS. 7-9 illustrate example processes that may be carried out to implement the example anisotropy modules of FIGS. 1-3, 4A-4D, 5 and 6.

FIG. 5 depicts an example manner of implementing the example anisotropy module 170 of FIGS. 1-3 and 4A-4D. To transmit signals, the example anisotropy module 170 of FIG. 5 includes a signal generator 505 and a transmitter array 510. The example signal generator 505 and the example transmitter array 510 of FIG. 5 may transmit one or more types of acoustic, sonic and/or seismic signals into the example wellbore 105. Example signals that may be transmitted by the signal generator 505 and the transmitter array 510 include, but are not limited to, quadrupole mode waves and Stoneley mode waves. Both quadrupole and Stoneley waves are dispersive, that is, their propagation speed changes with frequency. As shown in FIG. 6, the example transmitter array 510 may include four acoustic signal transmitters, one of which is shown at reference numeral 605, that are spaced substantially evenly around the circumference of the anisotropy module 170.

To receive the signals transmitted by the transmitter array 510, the example anisotropy module 170 of FIG. 5 includes a receiver array 515 and a receive module 520. The signals received at the receiver array 515 propagate from the transmitter array 510 via the wellbore 105 and the formation F and, thus, may be used to determine the anisotropy of the formation F. As shown in FIG. 6, the example receiver array 515 may include four azimuthal receiver sub-arrays, one of which is shown at reference numeral 610, that are spaced substantially evenly around the circumference of the anisotropy module 170. In some examples, each of the example azimuthal receiver sub-arrays 610 includes eight acoustic signal receivers, one of which is designated at reference numeral 615.

The example receive module 520 implements any number and/or type(s) of circuit(s), device(s) and/or component(s) to convert acoustic signals detected, measured and/or received via the example acoustic signal receivers 615 into digital signals and/or digital values that may be processed to detect, identify, measure, quantify and/or otherwise determine anisotropy indicators for the formation F. Because the geology of the formation F may vary with depth and/or location, different anisotropy indicators may be determined for respective locations and/or depths within the wellbore 105.

The example signal generator 505, the example transmitter array 510, the example receiver array 515 and the example receive module 520 of FIGS. 5 and 6 may operate in a coordinated fashion to transmit and measure the propagation of different types of signals. For example, the signal generator 505 and the transmitter array 510 may operate during a first time period and/or interval to transmit quadrupole acoustic signals into the wellbore 105 and during a second time period and/or interval to transmit Stoneley acoustic signals into the wellbore 105. Accordingly, the example receiver array 515 and the example receive module 520 may measure propagations of the quadrupole signals during the first interval and propagations of the Stoneley signals during the second time interval. Typically, the first and second time intervals do not overlap.

To compute and/or determine values representative of shear slowness, the example anisotropy module 170 of FIG. 5 includes a quadrupole module 525 and a Stoneley module 530. Using measurements of propagated quadrupole waves obtained via the example receiver array 515 and the example receive module 520, the example quadrupole module 525 of FIG. 5 computes and/or determines a value representative of shear slowness. In some examples, slowness values are determined for respective signal frequencies. The variation in the slowness values with frequency represents the dispersion of the quadrupole waves. Using measurements of propagated Stoneley waves obtained via the receiver array 515 and the receive module 520, the example Stoneley module 530 of FIG. 2 likewise computes and/or determines one or more additional values representative of shear slowness at respective signal frequencies. The example quadrupole module 525 and the example Stoneley module 530 compute their respective shear slowness values assuming a homogenous isotropic formation F and, thus, no additional anisotropy knowledge is required or needs to be assumed. Example methods and apparatus that may be used to implement the example quadrupole module 515 and the example Stoneley module 530 of FIG. 5 are described in U.S. Pat. No. 5,278,805, U.S. Pat. No. 7,257,489, U.S. Pat. No. 7,463,550, U.S. Patent Publication No. 2006/0120217, and by O. Y. Liu in a paper entitled "Stoneley Wave-Derived Δt Shear Log" and published in SPWLA 25$^{th}$ Annual Logging Symposium, Jun. 10-13, 1984, each of which is hereby incorporated by reference in its entirety.

To calculate a value and/or indicator representative of the anisotropy of the formation F, the example anisotropy module 170 of FIG. 5 includes an anisotropy determiner 535. The example anisotropy determiner 535 of FIG. 5 determines the anisotropy indicator(s) by comparing the shear slowness value(s) computed by the quadrupole module 525 based on transmitted quadrupole mode waves to the shear slowness value(s) computed by the Stoneley module 530 based on transmitted Stoneley mode waves. Quadrupole mode waves are more sensitive to axial shear of the formation F than to transverse shear. On the other hand, Stoneley mode waves are more sensitive to transverse sheer of the formation F than to axial sheer. In homogenous isotropic (HI) formations F, the shear slowness values computed by the quadrupole module 525 and the Stoneley module 530 will be substantially equal. However, in anisotropic (e.g., non-HI) formations F, the shear slowness values will differ and/or disagree. The example anisotropy determiner 535 of FIG. 5 compares the shear slowness values computed by the example quadrupole module 525 and the Stoneley module 530. If the difference(s) between the two shear slowness values is/are less than a threshold and/or criteria, the anisotropy determiner 535 identifies the formation F as homogeneous isotropic. However, if the difference(s) is/are not less than the threshold and/or criteria, the anisotropy determiner 535 identifies the formation F as anisotropic. The threshold and/or criteria may be selected to, for example, accommodate component variation(s), measurement error (s), noise, etc. in the example signal generator 505, the example transmitter array 510, the example receiver array 515 and/or the example receive module 520.

Figure 10:
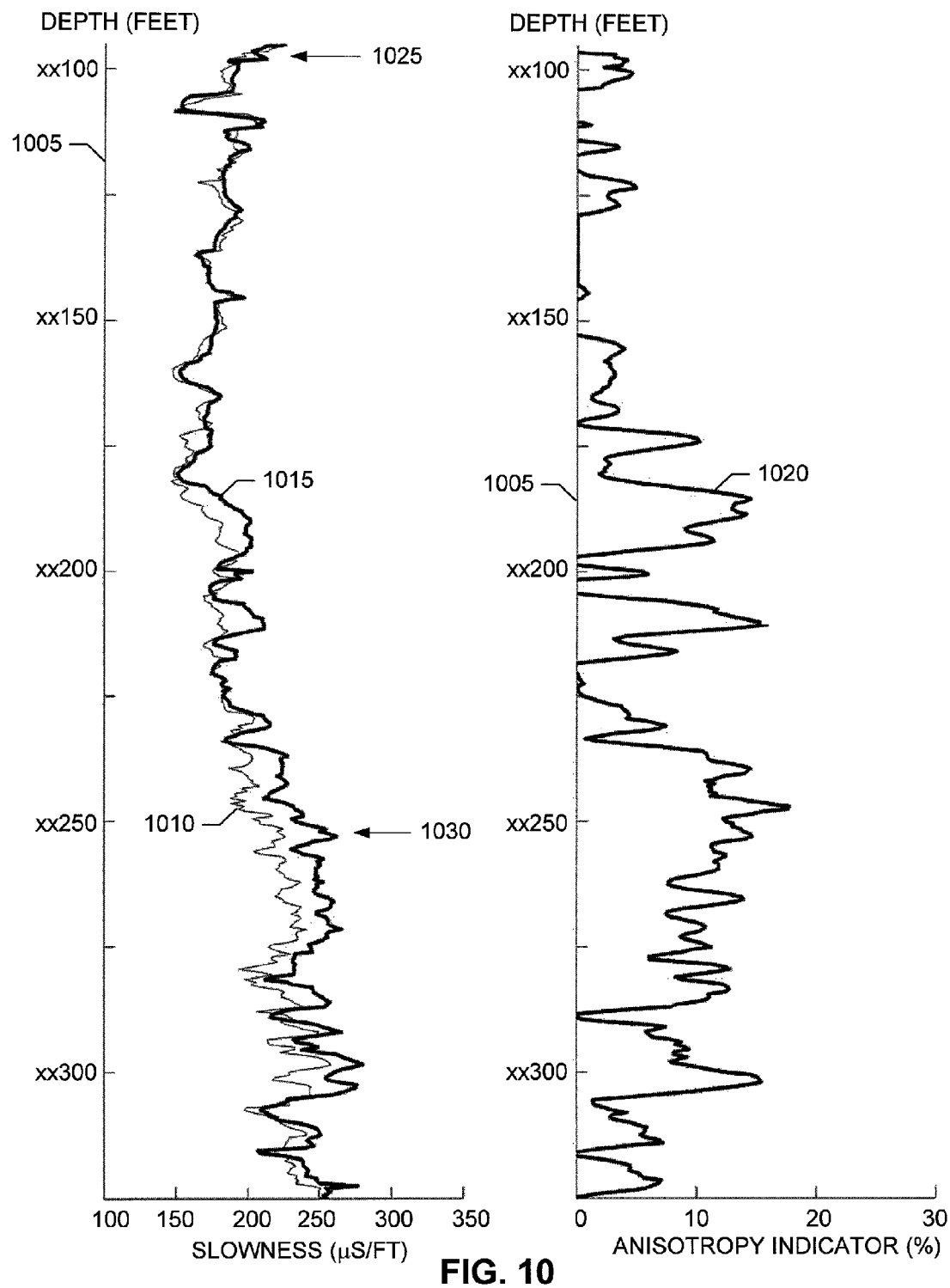
FIGS. 10-14 illustrate example measurements that may be obtained using the example anisotropy modules described herein.

FIG. 10 illustrates, for different depths 1005 within the wellbore 105, example shear slowness values 1010 computed from quadrupole waves, example shear slowness values 1015 computed from Stoneley waves, and corresponding anisotropy indicator values 1020. At each depth 1005, the example anisotropy determiner 535 of FIG. 5 computes the anisotropy indicator values 1020 using the following mathematical expression $$Q_{anis} = 100\left(\frac{S_q - S_{St}}{S_{St}}\right), \quad \text{EQN (1)}$$

where $Q_{anis}$, $S_q$, and $S_{St}$ are the anisotropy indicator, the quadrupole shear slowness value and the Stoneley shear slowness value, respectively. In the example of FIG. 10, there is a meaningful difference between the slowness values 1010 and 1015 at depths 1005 between xx175 and xx310 feet, except for some short intervals. Accordingly, the example anisotropy determiner 535 of FIG. 5 identifies the formation F as anisotropic at these depths.

Figure 11:
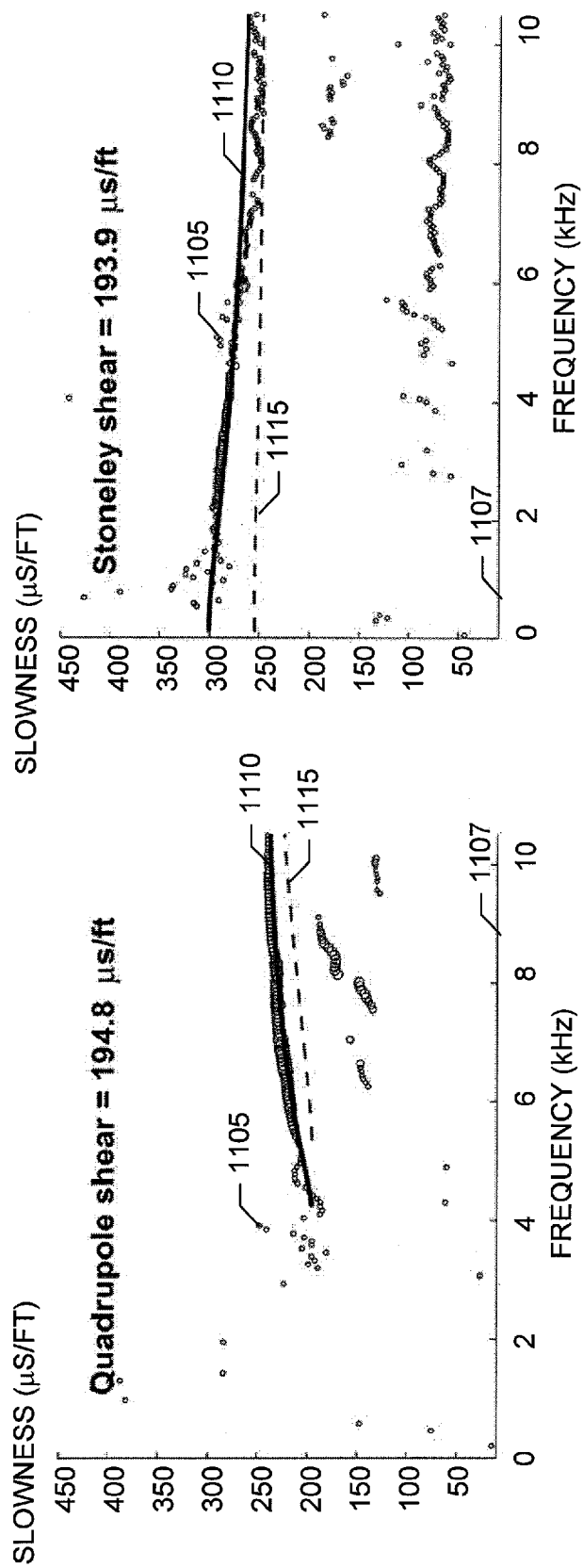

FIG. 11 illustrates measured dispersions 1105 (i.e., slowness values for different frequencies 1107) and modeled dispersions 1110 and 1115 at depth 1025 of FIG. 10. The left sub-plot of FIG. 11 is for quadrupole waves, and the right sub-plot is for Stoneley waves. As shown in FIG. 10, the quadrupole and Stoneley shear slowness values are substantially equal at depth 1025. The measured dispersions 1105 of FIG. 11 substantially correspond to the model 1110, which assumes an HI formation. As discussed below, the model 1110 accounts for acoustic signal biases caused by the presence of the LWD 155 within the wellbore 105, while the model 1115 does not account for such acoustic signal biases. Accordingly, the model 1110 more closely corresponds to the measurements 1105 than the model 1115.

Figure 12:
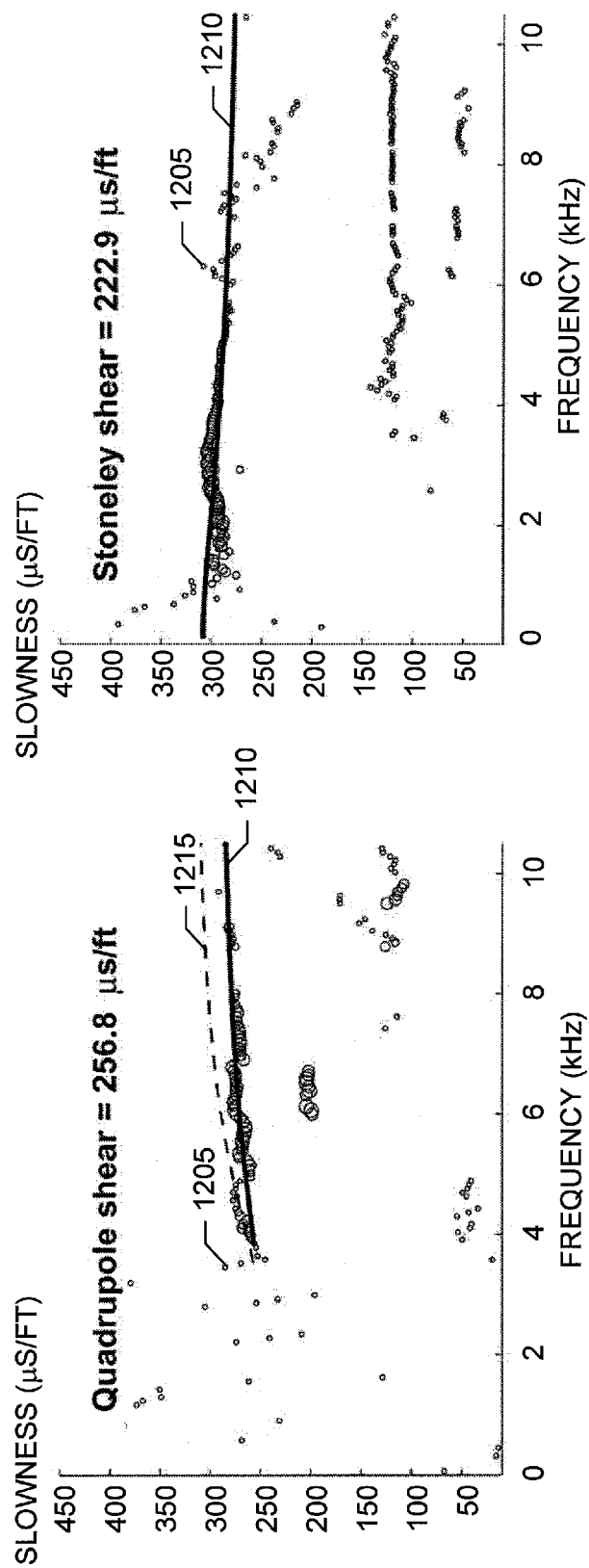

FIG. 12 illustrates measured dispersions 1205 and modeled dispersions 1210 at depth 1030 of FIG. 10. Like the example of FIG. 11, results using quadrupole waves are shown in the left sub-plot and Stoneley waves in the right sub-plot. The example model 1210 of FIG. 12 assumes a vertically transversally isotropic (VTI) anisotropic formation F. As such, the measured dispersions 1210 for the quadrupole waves are flatter than a model 1215 computed assuming an HI formation, as shown in the left sub-plot of FIG. 12.

Figure 13:
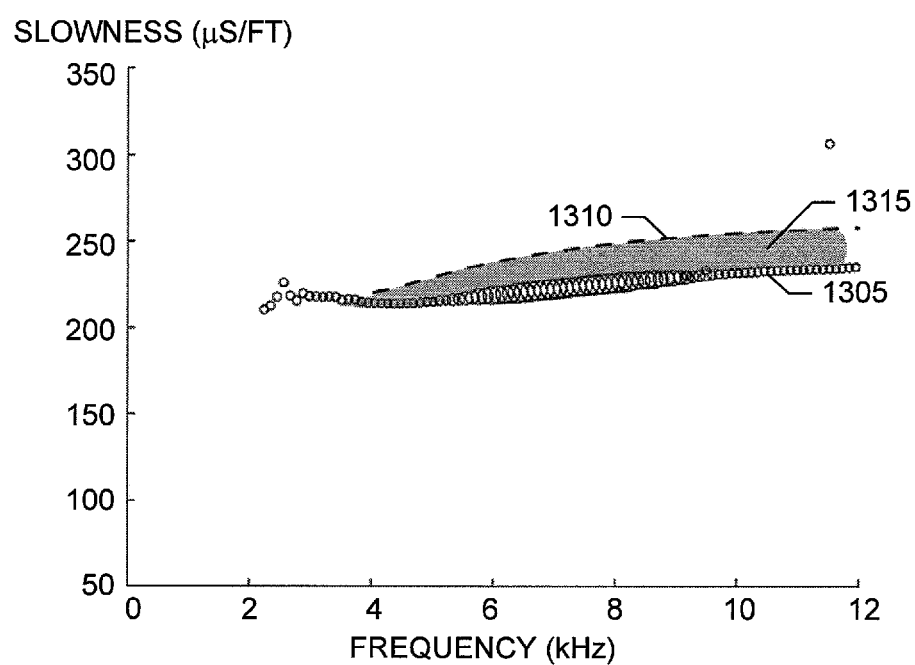

FIG. 13 illustrates example quadrupole dispersions 1305 computed assuming a VTI formation F and a dispersion curve 1310 computed using a model that assumes an HI formation F. In the example of FIG. 13, a value of $\gamma = (c_{66} - c_{44})/2c_{44} = 0.6$ for the VTI model is assumed. As shown in FIG. 13, when the formation F is VTI anisotropic, the quadrupole dispersions 1305 become flatter than dispersions 1310 computed using an HI formation 1310. Accordingly, as shown in FIG. 13, anisotropy can, additionally or alternatively, be identified using only quadrupole waves. The departure of the HI model dispersion curve 1310 from the measurements 1305, which is depicted as a gray area 1315 in FIG. 13, becomes larger for more strongly anisotropic formations F.

Figure 14:
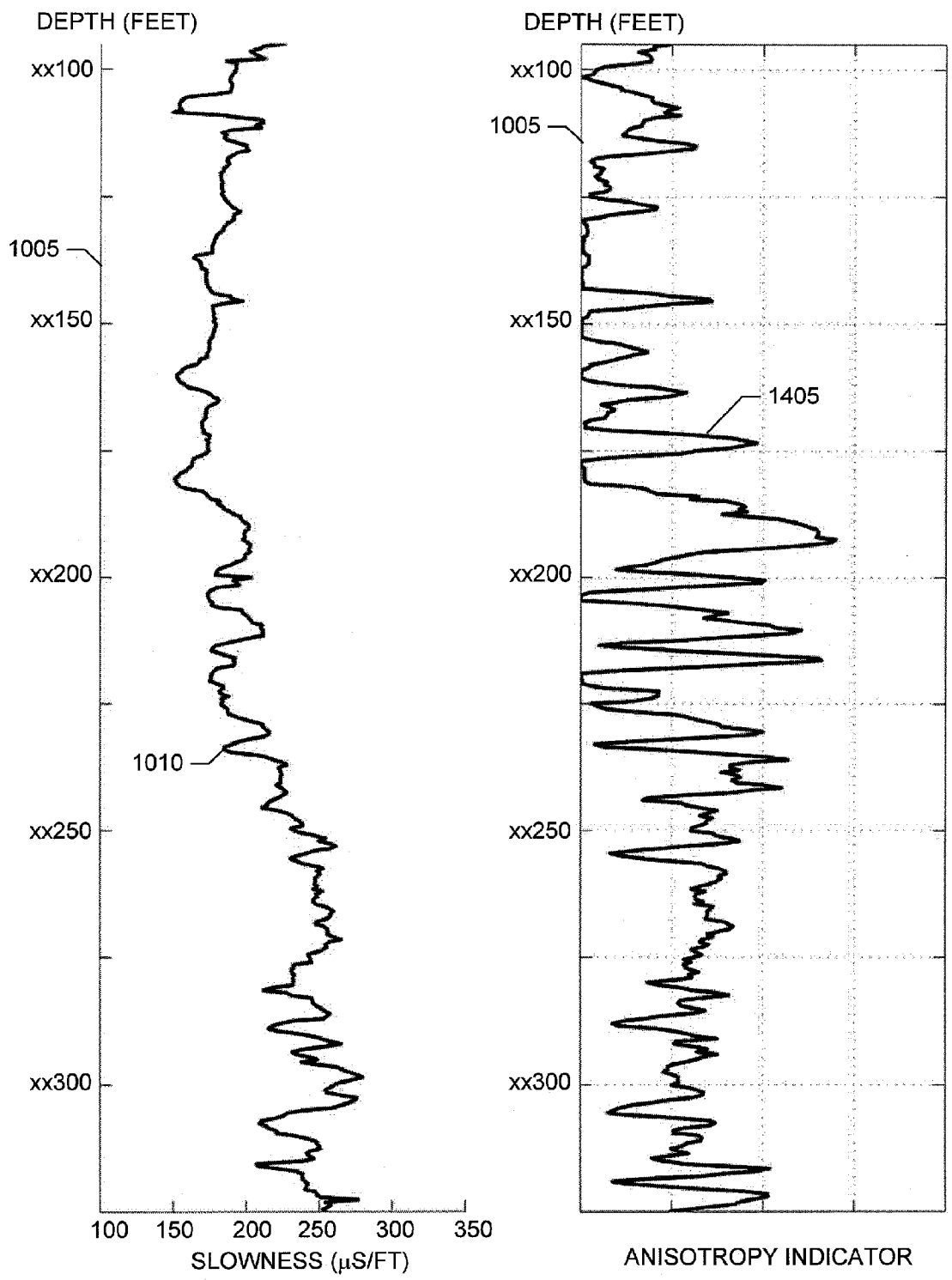

FIG. 14 shows additional example anisotropy indicators 1405 that may be computed from the example quadrupole shear slowness values 1010 of FIG. 10. The example anisotropy indicators 1405 of FIG. 14 are computed for each depth 1005 by integrating and/or summing the differences between the dispersions 1205 (FIG. 12) extracted from the measured waves and a model 1215 assuming an HI formation F for that depth 1005. In other words, the example anisotropy determiner 535 computes, for each of a plurality of frequencies, a difference between the dispersions 1205 and the dispersions 1215, and adds together, integrates and/or sums the computed differences. In the example of FIG. 14, the differences are summed and/or integrated over the frequency range of 0 to 10 kHz. Comparing FIGS. 10 and 14, there is a substantial correlation and/or match between the example anisotropy indicators 1020 of FIG. 10 and the example anisotropy indicators 1405 of FIG. 14.

The presence of the anisotropy tool 170 of FIG. 6 within the wellbore 105 may introduce an acoustic bias into measurements taken by the example receiver array 515. Such biases may be stronger and/or more prevalent for while drilling tools such as the example LWD module 155, which are typically constructed using a drill collar (e.g., a thick steel pipe). Furthermore, a drill collar for while drilling tools may cause interference between a borehole flexural mode and a collar flexural mode. Therefore, borehole flexural modes typically cannot be applied to the example LWD module 155 of FIG. 1 in the same way as for the example wireline tool 205 of FIG. 2. To compensate and/or mitigate such effects, the example anisotropy module or tool 170 of FIG. 5 may include a tool model 540. The example tool model 540 of FIG. 5 compensates for the presence of the LWD module 155 within the wellbore 105. The example tool model 540 models the effect of the anisotropy module 170 and/or the LWD module 155 during calculations of the dispersions of the quadrupole and/or the Stoneley waves. Given borehole parameters such as formation compressional slowness and density, mud properties, borehole diameter, the dispersions of the borehole modes resulting from the presence of the LWD module 155 within the wellbore 105 can be calculated. Example methods and apparatus that may be used to compute the dispersions of the borehole flexural modes resulting from the presence of the LWD module 155 in the wellbore 105 are described in U.S. Pat. No. 7,529,152, which is hereby incorporated by reference in its entirety. As shown in FIG. 11, compensating for the acoustic biases results in a better match between the measured slowness values 1105 and the model 1110 than for the model 1115, which does not compensate for the presence of the LWD module 155 within the wellbore 105.

To output or store anisotropy indicators computed by the example anisotropy determiner 535, the example anisotropy module 170 of FIG. 5 includes any number and/or type(s) of output interface(s) such as the example telemetry module 180 and/or any number and/or type(s) of memory(-ies), memory device(s), storage and/or storage device(s) 545. Anisotropy indicators may be conveyed to a surface location (e.g., to the example control and data acquisition system 175) via the example telemetry module 180 substantially as they are computed and/or may be stored in the storage 545 for subsequent retrieval to the surface location. Additionally or alternatively, acoustic waves and/or signals measured by the example receiver array 515 and the example receive module 520 may be conveyed to the surface location via the telemetry module 180 and/or stored in the storage 545 for subsequent retrieval at the surface location. In such examples, the anisotropy indicators described herein may be computed by the example processor 186 of the example control and data acquisition system 175 rather than in the anisotropy module 170.

While an example manner of implementing the anisotropy module 170 is illustrated in FIG. 5, one or more of the elements, sensors, circuits, modules, processors, controllers and/or devices illustrated in FIG. 5 may be combined, divided, re-arranged, omitted, eliminated and/or implemented in any other way. For example, the quadrupole module 525, the Stoneley module 530, the tool model 540 and the anisotropy determiner 535 may be implemented at a surface location (e.g., by the example processor 186 of the example control and data acquisition system 175) with signals measured by the receiver array 515 and the receive module 520 sent to the surface location via the example telemetry module 180 and/or stored in the example storage 545 for subsequent retrieval to the surface location. Further, any of the example elements, sensors, circuits, modules, processors, controllers, devices and/or, more generally, the example anisotropy module 170 may be implemented by hardware, software, firmware and/or any combination of hardware, software and/or firmware. Thus, for example, any or all of the example elements, sensors, circuits, modules, processors, controllers, devices and/or, more generally, the example anisotropy module 170 may be implemented by one or more circuit(s), programmable processor(s), ASIC(s), PLD(s), FPLD(s), FPGA (s), etc. In some examples, the quadrupole module 525, the Stoneley module 530, the tool model 540 and the anisotropy determiner 535 are embodied in machine-accessible instructions that may be carried out by the example processor P105 of FIG. 15 and/or the example processor 186 of FIGS. 1 and 2. Further still, the anisotropy module 170 may include elements, sensors, circuits, modules, processors, controllers and/or devices instead of or in addition to those illustrated in FIG. 5, and/or may include more than one of any or all of the illustrated elements, sensors, circuits, modules, processors, controllers and/or devices.

Figure 8:
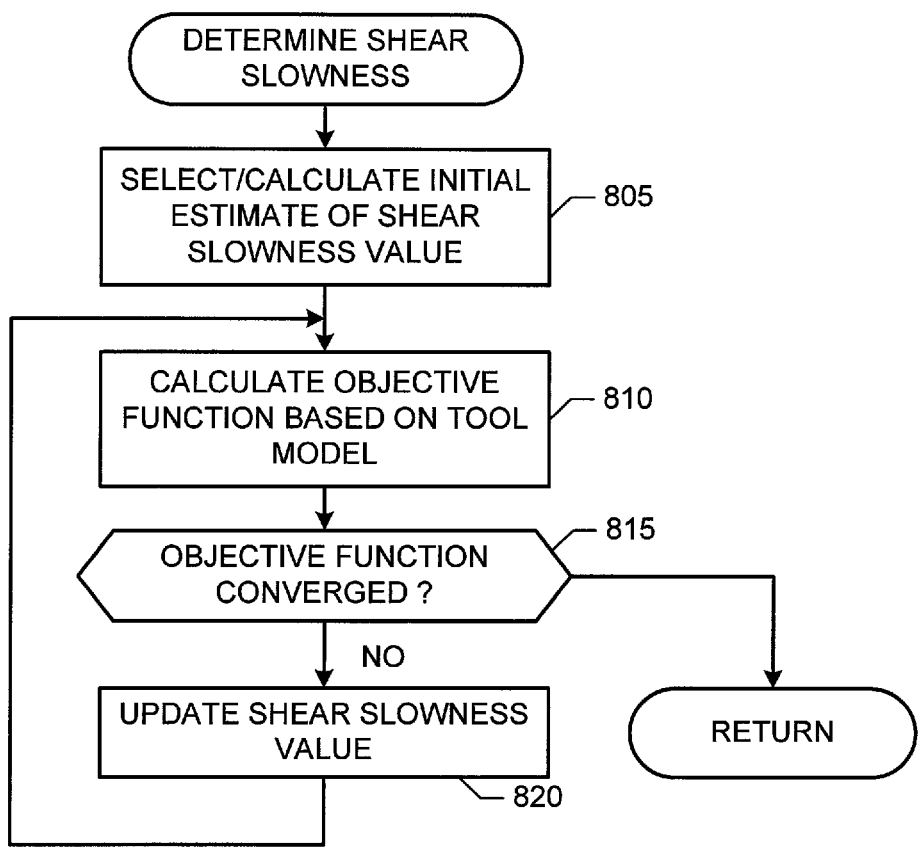
Figure 9:
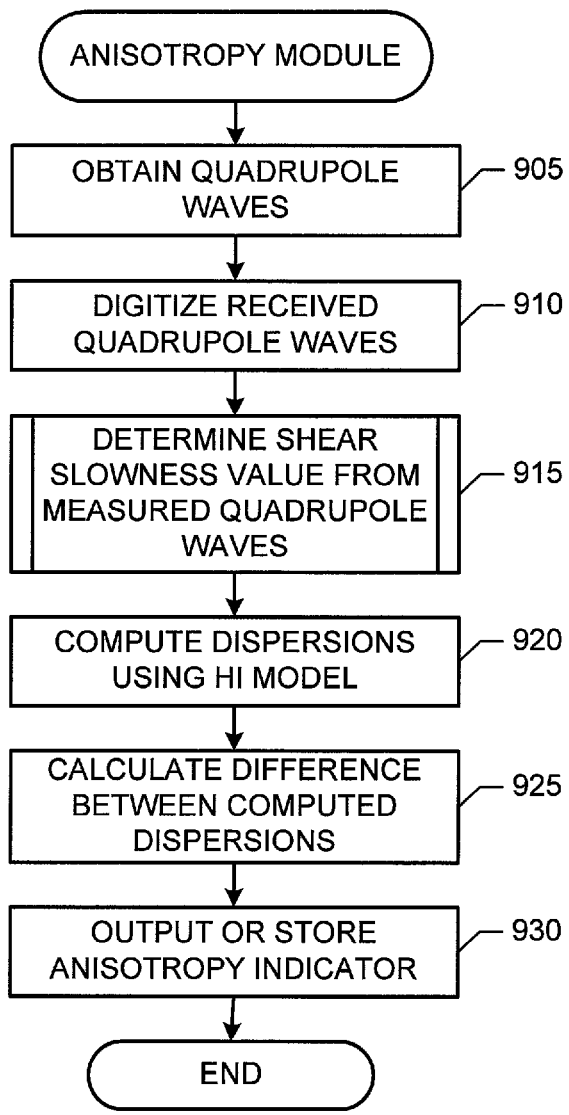

FIGS. 7-9 are flowcharts representative of example processes that may be carried out to implement the example anisotropy module 170 of FIGS. 1-3, 4A-4D, 5 and 6. The example processes of FIGS. 7-9 may be carried out by a processor, a controller and/or any other suitable processing device. For example, the example processes of FIGS. 7-9 may be embodied in coded instructions stored on an article of manufacture such as any tangible computer-readable and/or computer-accessible media. Example tangible computer-readable medium include, but are not limited to, a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other tangible medium which can be used to store and/or carry program code and/or instructions in the form of machine-accessible and/or machine-readable instructions or data structures, and which can be accessed by a processor, a general-purpose or special-purpose computer, or other machine with a processor (e.g., the example processor 186 of FIGS. 1 and 2, and/or the example processor platform P100 discussed below in connection with FIG. 15). Combinations of the above are also included within the scope of computer-readable media. Machine-readable instructions comprise, for example, instructions and/or data that cause a processor, a general-purpose computer, special-purpose computer, or a special-purpose processing machine to implement one or more particular processes. Alternatively, some or all of the example processes of FIGS. 7-9 may be implemented using any combination(s) of ASIC(s), PLD(s), FPLD(s), FPGA(s), discrete logic, hardware, firmware, etc. Also, some or all of the example processes of FIGS. 7-9 may instead be implemented manually or as any combination of any of the foregoing techniques, for example, any combination of firmware, software, discrete logic and/or hardware. Further, many other methods of implementing the example operations of FIGS. 7-9 may be employed. For example, the order of execution of the blocks may be changed, and/or one or more of the blocks described may be changed, eliminated, sub-divided, or combined. Additionally, any or all of the example processes of FIGS. 7-9 may be carried out sequentially and/or carried out in parallel by, for example, separate processing threads, processors, devices, discrete logic, circuits, etc.

The example process of FIG. 7 may be carried out to determine an anisotropy indicator for a particular depth or location within the wellbore 105. To obtain anisotropy indicators for different depths and/or locations, the example process of FIG. 7 may be carried out multiple times at the different depths and/or locations. The example process of FIG. 7 begins with the example receiver array 515 receiving quadrupole waves propagating in the wellbore 105 and/or the formation F (block 705) and the example receive module 520 digitizing the received quadrupole waves (block 710). The example quadrupole module 525 determines a shear slowness value from the digitized quadrupole waves (block 715). An example process that may be carried out to compute shear slowness values is described below in connection with FIG. 8. Additionally or alternatively, the shear slowness values may be computed using the example methods described in U.S. Pat. No. 5,278,805, U.S. Patent Publication No. 2006/0120217, and by O. Y. Liu in the paper entitled "Stoneley Wave-Derived Δt Shear Log" and published in SPWLA 25$^{th}$ Annual Logging Symposium, Jun. 10-13, 1984. Further still, the shear slowness values may be computed using the example methods described in U.S. Pat. No. 7,529,152.

The example receiver array 515 receives Stoneley waves propagating in the wellbore 105 and/or the formation F (block 720) and the example receive module 520 digitizes the received Stoneley waves (block 725). The example Stoneley module 530 determines a shear slowness value from the digitized Stoneley waves (block 730). An example process that may be carried out to compute shear slowness values is described below in connection with FIG. 8. Additionally or alternatively, the shear slowness values may be computed using the example methods described in U.S. Pat. No. 5,278,805, U.S. Patent Publication No. 2006/0120217, and by O. Y. Liu in the paper entitled "Stoneley Wave-Derived Δt Shear Log" and published in SPWLA 25$^{th}$ Annual Logging Symposium, Jun. 10-13, 1984. Further still, the shear slowness values may be computed using the example methods described in U.S. Pat. No. 7,529,152.

The example anisotropy determiner 535 compares the computed shear slowness values to determine an anisotropy indicator for the formation at the presently considered depth and/or location in the wellbore 105 (block 735). The anisotropy determiner 535 sends the computed anisotropy indicator to the example control and data acquisition system 175 via the example telemetry module 180 and/or stores the computed anisotropy indicator in the example storage 545 (block 740). Control then exits from the example process of FIG. 7.

The example process of FIG. 8 may be carried out to compute a shear slowness value using a model of a downhole tool. The example process of FIG. 8 begins with the quadrupole module 525 or the Stoneley module 530 selecting or calculating an initial estimate of the shear slowness (block 805). The tool model 540 calculates an output of an objective function based on a model of the LWD 155 and the current estimate of the shear slowness (block 810). If the outputs of the objective function have converged (block 815), control returns from the example process of FIG. 8 to, for example, the example process of FIG. 7 at block 720 or 735. If the outputs of the objective function have not converged (block 815), the quadrupole module 525 or the Stoneley module 530 updates the estimate of the shear slowness (block 820) and control returns to block 810 compute another output of the objective function.

The example process of FIG. 9 may be carried out to compute anisotropy indicators for a particular depth or location within the wellbore 105 using only quadrupole waves. To obtain anisotropy indicators for different depths and/or locations, the example process of FIG. 9 may be carried out multiple times at the different depths and/or locations. The example process of FIG. 9 begins with the example receiver array 515 receiving quadrupole waves propagating in the wellbore 105 and/or the formation F (block 905) and the example receive module 520 digitizing the received quadrupole waves (block 910). The example quadrupole module 525 determines a shear slowness value from the digitized quadrupole waves (block 915). An example process that may be carried out to compute shear slowness values was described above in connection with FIG. 8. Additionally or alternatively, the shear slowness values may be computed using the example methods described in U.S. Pat. No. 5,278,805, U.S. Patent Publication No. 2006/0120217, and by O. Y. Liu in the paper entitled "Stoneley Wave-Derived Δt Shear Log" and published in SPWLA 25$^{th}$ Annual Logging Symposium, Jun. 10-13, 1984. Further still, the shear slowness values may be computed using the example methods described in U.S. Pat. No. 7,529,152.

The example anisotropy determiner 535 computes dispersions (i.e., slowness values for multiple signal frequencies) using an HI model (block 920) and calculates differences between the slowness values computed from the measure quadrupole waves and using the HI model to determine an anisotropy indicator for the formation at a presently considered depth and/or location in the wellbore 105 (block 925). The anisotropy determiner 535 sends the computed anisotropy indicator to the example control and data acquisition system 175 via the example telemetry module 180 and/or stores the computed anisotropy indicator in the example storage 545 (block 930). Control then exits from the example process of FIG. 9.

Figure 15:
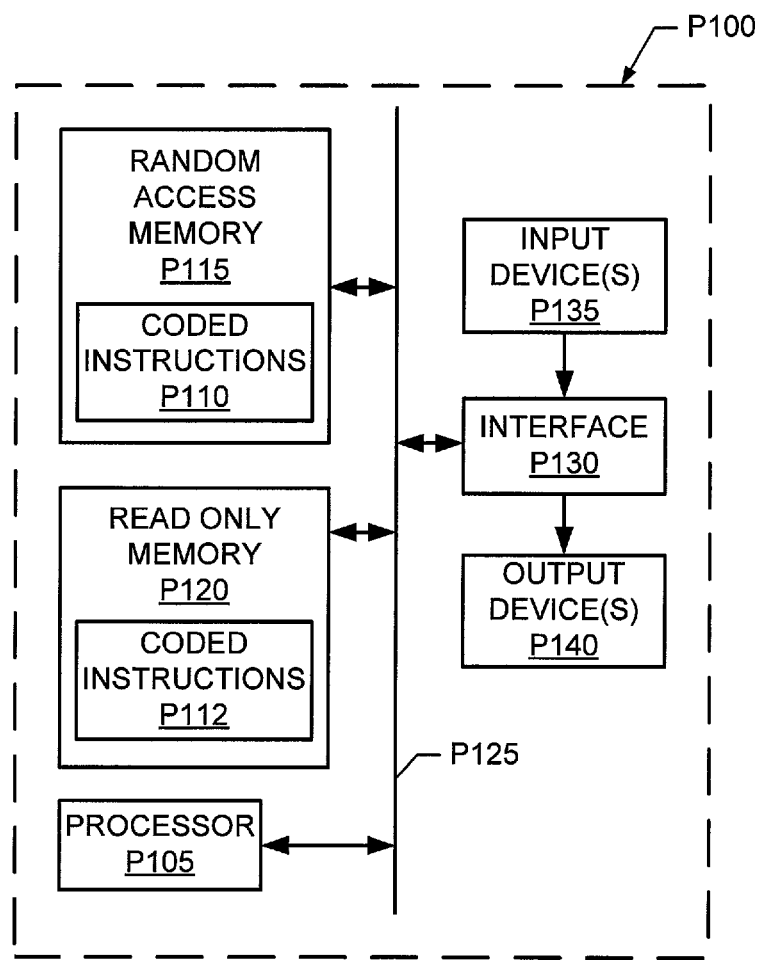
FIG. 15 is a schematic illustration of an example processor platform that may be used and/or programmed to carry out the example processes of FIGS. 7-9, and/or to implement any of all of the methods, apparatus and articles of manufacture disclosed herein.

FIG. 15 is a schematic diagram of an example processor platform P100 that may be used and/or programmed to implement the example anisotropy module 170 of FIGS. 1-3, 4A-D, 5 and 6 and/or the example processes of FIGS. 7-9. For example, the processor platform P100 can be implemented by one or more general-purpose processors, processor cores, microcontrollers, etc.

The processor platform P100 of the example of FIG. 15 includes at least one general-purpose programmable processor P105. The processor P105 executes coded instructions P110 and/or P112 present in main memory of the processor P105 (e.g., within a RAM P115 and/or a ROM P 120). The processor P105 may be any type of processing unit, such as a processor core, a processor and/or a microcontroller. The processor P105 may carry out, among other things, the example processes of FIGS. 7-9 to determine anisotropy indicators.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown). The memory P115, P120 may be used to implement the example storage 545 of FIG. 5.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The example input and output devices P135 and P140 may be used to, for example, implement the example telemetry module 180.

Example methods, apparatus and articles of manufacture to determine anisotropy indicators for subterranean formations are disclosed. Certain disclosed examples determine axial-versus-transverse shear-wave anisotropy by comparing shear slowness values computed from quadrupole waves and shear slowness values computed from Stoneley waves. The borehole quadrupole mode has higher sensitivity to the axial shear of a formation than transverse shear. On the other hand, the Stoneley mode has higher sensitivity to transverse shear than axial shear. Therefore, quadrupole mode shear slowness values and Stoneley mode shear slowness values are consistent or similar in HI formations, and are distinct or different in anisotropic formations. The difference between the two types of shear slowness values represents the intensity of axial-versus-transverse shear-wave anisotropy. The examples disclosed herein may, additionally or alternatively, be used to detect anisotropy of a formation in the presence of a drill collar.

The shear slowness values may be computed assuming an HI formation and, thus, no additional knowledge regarding anisotropy of the formation, such as dispersions of borehole modes in anisotropic formations or tool response in anisotropic formations, is required.

To improve accuracy when computing shear slowness from the measured waves, dispersiveness of the borehole mode and/or the presence of the LWD module within a wellbore may compensated. While models for the dispersiveness of the borehole mode and the presence of the LWD module are complex functions of borehole parameters and may differ between an HI formation and an anisotropic formation, the examples disclosed herein may assume an HI formation while computing shear slowness values.

In particular examples, quadrupole dispersions are not compared to Stoneley dispersions to determine anisotropy indicators. When the formation is VTI anisotropic, quadrupole dispersions assuming a VTI model are flatter than for a model assuming an HI formation. Thus, anisotropy can also be identified by characterizing and/or computing the difference(s) between the VTI model and the HI model. Such differences are larger for more strongly anisotropic formations.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method, comprising:
   computing a first shear slowness value from measured quadrupole waves;
   computing a second shear slowness value from measured Stoneley waves;
   updating at least one of the first and second shear slowness values until an objective function based on a tool model converges; and
   comparing the first and second shear slowness values to determine an anisotropy indicator representative of anisotropy of a subterranean formation.

2. A method as defined in claim 1, wherein comparing the first and second shear slowness values to determine the anisotropy indicator comprises:
   computing a difference between the first and second shear slowness values; and
   comparing the difference to a threshold.

3. A method as defined in claim 1, wherein the first shear slowness value is computed from the measured quadrupole waves based on a model that represents an acoustic bias in the measured quadrupole waves due to a presence of a downhole tool in the formation.

4. A method as defined in claim 1, wherein the second shear slowness value is computed from the measured Stoneley waves based on a model that represents an acoustic bias in the measured Stoneley waves due to a presence of a downhole tool in the formation.

5. A method as defined in claim 1, further comprising representing in a model for computing at least one of the slowness values, presence of a downhole tool in the formation that imparts an acoustic bias, wherein the downhole tool comprises at least one of a wireline tool or a while drilling tool.

6. A method as defined in claim 1, further comprising sending the measured quadrupole and Stoneley waves to a surface location, wherein the anisotropy indicator is determined at the surface location.

7. A method as defined in claim 1, further comprising measuring the quadrupole waves at a downhole position within the formation.

8. A method as defined in claim 1, wherein the second shear slowness value is computed prior to the first shear slowness value.

9. The method of claim 1 further comprising repeating the method to determine a plurality of the anisotropy indicators wherein each of the plurality of anisotropy indicators corresponds to a different depth within a wellbore.

10. The method of claim 9 further comprising storing the plurality of anisotropy indicators with respect to depth for a range of depths within the wellbore.

11. The method of claim 9 further comprising, based at least in part on a portion of the anisotropy indicators, identifying a region of the subterranean formation, with respect to depth within the wellbore, as being an anisotropic region.

12. The method of claim 11 wherein an anisotropic region is a nonhomogeneous isotropic (non-HI) region.

13. The method of claim 9 further comprising, based at least in part on a portion of the anisotropy indicators, identifying a region of the subterranean formation, with respect to depth within the wellbore, as being a homogeneous isotropic (HI) region.

14. The method of claim 1 wherein the comparing the first and second shear slowness values to determine an anisotropy indicator comprises using the following relationship: (Sq−SSt)/SSt, where Sq is the first shear slowness value and where SSt is the second shear slowness value.

15. A downhole tool apparatus, comprising:
a first receiver to measure quadrupole waves;
a second receiver to measure Stoneley waves;
a quadrupole module to compute a first shear slowness value from the measured quadrupole waves;
a Stoneley module to compute a second shear slowness value from the measured Stoneley waves; and
an anisotropy determiner to update at least one of the first and second shear slowness values until an objective function calculated on a tool model converges and to compare the first and second shear slowness values to determine an anisotropy indicator representative of anisotropy of a subterranean formation.

16. A downhole tool apparatus as defined in claim 15, wherein the anisotropy determiner is to compute a difference between the first and second shear slowness values, and compare the difference to a threshold to determine the anisotropy indicator.

17. A downhole tool apparatus as defined in claim 15, further comprising a tool model to compensate an acoustic bias in the measured quadrupole waves due to a presence of a downhole tool in the formation.

18. A downhole tool apparatus as defined in claim 15, further comprising a tool model to compensate an acoustic bias in the measured Stoneley waves due to a presence of a downhole tool in the formation.

19. A downhole tool apparatus as defined in claim 15, wherein the apparatus comprises at least one of a wireline tool or a while drilling tool.

20. A downhole tool apparatus as defined in claim 15, wherein the second receiver comprises the first receiver.

21. A method, comprising:
computing a first shear slowness value from measured quadrupole waves;
computing a second shear slowness value from measured Stoneley waves;
updating at least one of the first and second shear slowness values until an objective function based on a tool model converges; and
comparing the first and second shear slowness values to determine an anisotropy indicator representative of anisotropy of a subterranean formation;
wherein the second shear slowness value is computed prior to the first shear slowness value.

* * * * *